United States Patent [19]  [11] 3,714,276
Pierce et al.  [45] Jan. 30, 1973

[54] DIFUNCTIONAL TETRAFLUOROBENZENE

[75] Inventors: Ogden R. Pierce; John R. Greenwald, both of Midland, Mich.

[73] Assignee: Dow Corning Corporation, Midland, Mich.

[22] Filed: Aug. 27, 1970

[21] Appl. No.: 67,619

[52] U.S. Cl. ....260/650 F, 260/46.5 P, 260/448.2 D, 260/488 CD, 260/618 D, 260/825

[51] Int. Cl. ............................................C07c 25/04
[58] Field of Search .....................260/488 CD, 650 F

[56] References Cited

UNITED STATES PATENTS 3,046,313    7/1962    Pummer et al. ..................260/650 F Primary Examiner—Howard T. Mars
Attorney—Robert F. Fleming, Jr., Laurence R. Hobey, Harry D. Dingman, Howard W. Hermann and Norman E. Lewis

[57] ABSTRACT 2,4,5,6-tetrafluorobenzene compounds having $\beta$-hydroxyethyl, $\beta$-acetoxyethyl or vinyl difunctionality are disclosed. The $\beta$-hydroxyethyl and $\beta$-acetoxyethyl functional compounds are precursors to a divinyltetrafluorobenzene which can be reacted with SiH compounds to provide siloxanes having $SiCH_2CH_2 C_6F_4CH_2CH_2Si$ linkages.

1 Claim, No Drawings

DIFUNCTIONAL TETRAFLUOROBENZENE

The invention herein described was made in the course of, or under, a contract or subcontract thereunder with the United States Air Force.

This invention relates to novel difunctional tetrafluorobenzene compounds.

More particularly, the invention is directed to tetrafluorobenzene compounds of the formula

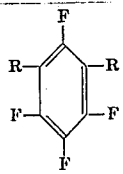

in which each R is the same and is selected from the group consisting of the β-hydroxyethyl radical, the β-acetoxyethyl and the vinyl radical.

The 1,3-bis(β-hydroxyethyl)-2,4,5,6-tetrafluorobenzene species is prepared by reacting 1,3-dichloro-tetrafluorobenzene with butyl lithium to obtain a reaction product which is then reacted with ethylene oxide. Acetylchloride is reacted with the β-hydroxyethyl compound to prepared 1,3-bis(β-acetoxyethyl)-tetrafluorobenzene which in turn is pyrolyzed to yield 1,3-divinyl-tetrafluorobenzene.

Divinyltetrafluorobenzene is reacted with functional ≡SiH compounds in the presence of a platinum catalyst to yield silcarbanes of the formula ≡ $SiCH_2CH_2C_6F_4CH_2CH_2Si$ ≡. Hydrolysis and condensation of silicon-bonded chlorine in the silcarbane produces siloxane elastomers, such as

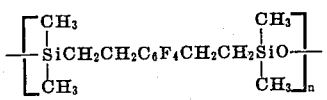

which are useful as solvent-resistant sealants.

The following examples are illustrative of the invention delineated in the claims.

EXAMPLE 1

Preparation of 1,3-bis(β-hydroxyethyl)tetrafluorobenzene.

1,3-Dichloro-tetrafluorobenzene (88 grams in one liter of ether) was introduced into a 3-liter flask which has been flushed with nitrogen. After cooling the contents of the flask to −76° C., 440 grams of 15.2 percent butyllithium in hexane was added very slowly. Addition was complete in 3 hours. The reaction mixture was stirred at dry ice temperature for an additional 3 hours, after which 70 grams of ethylene oxide was added. This reaction mixture was stirred at dry ice temperature overnight and allowed to warm gradually to +20° C. One-half liter of dilute hydrochloric acid was added and the phases were separated. The organic layer was washed with water, dried and filtered to remove solids. After evaporation of the solvent and recrystallization from carbon tetrachloride-toluene mixture, a white crystalline solid having a melting point of 103.5°–104.5 ° C. was obtained The structure,

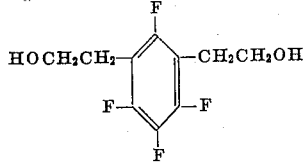

was confirmed by mass spectral and infrared analysis.

EXAMPLE 2

Preparation of 1,3-bis(β-acetoxyethyl)tetrafluorobenzene.

Acetyl chloride (40 grams) was slowly added to an ice water cooled mixture of 28 grams of 1,3-bis(β-hydroxyethyl)-tetrafluorobenzene and 40 grams of pyridine in 250 ml. of ether. After addition of the acetyl chloride, the ice water bath was removed and the mixture was allowed to stir for an additional hour. Water (150 ml.) was added and the phases were separated. The ether phase was washed with water and dried over anhydrous $CaSO_4$. After filtration the ether was evaporated and the residue was fractionated to yield 29.4 grams of 1,3-bis(β-acetoxyethyl)tetrafluorobenzene having a boiling point of 120° C./0.7 mm Hg.

EXAMPLE 3

Preparation of 1,3-divinyl tetrafluorobenzene.

A vertical quartz tube (1 inches–dia. and 18 inches long) was packed with 130 grams of 3/16 inches dia. alumina spheres and heated to 550° C. Nitrogen flow was adjusted to 100–150 ml./min. The diacetate product of Example 2 was added dropwise to the top of the tube. This pyrolysis yielded a yellow liquid which was dissolved in ether, washed several times with water and dried. The solvent was evaporated and the residue fractionated to obtain 1,3-divinyl tetrafluorobenzene having a boiling point of 62° C./5 mm Hg.

EXAMPLE 4

The 1,3-divinyl tetrafluorobenzene product of Example 3 was reacted with 3,3,3-trifluoropropylmethylchlorosilane in the presence of chloroplatinic acid to obtain an an organosilicon compound of the formula

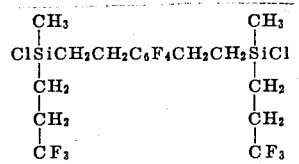

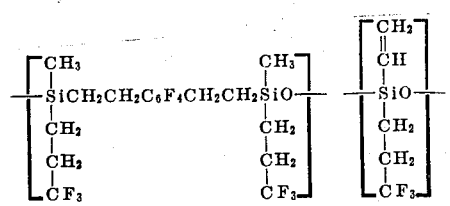

When compounded with silica filler and cured by means of benzoyl peroxide and heat the polymer was a strong elastomeric material.
That which is claimed is:
1. A compound of the formula
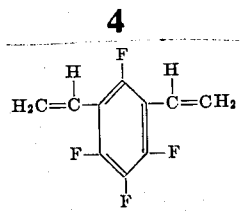

This compound was cohydrolyzed with 3,3,3-trifluoropropyl vinyldichlorosilane by addition in an ether solution to water. The cohydrolzate was condensed by the addition of tetramethylquanidine-acetic acid catalyst to yield a hydroxy-terminated copolymer of the formula